United States Patent
Hernández Encinas et al.

(10) Patent No.: US 9,191,214 B2
(45) Date of Patent: Nov. 17, 2015

(54) PROCEDURE FOR A MULTIPLE DIGITAL SIGNATURE

(75) Inventors: Luis Hernández Encinas, Madrid (ES);
Jaime Muñoz Masqué, Madrid (ES);
José Raúl Durán Díaz, Madrid (ES);
Fernando Hernández Álvarez, Madrid (ES); Victor Gayoso Martínez, Madrid (ES)

(73) Assignee: Telefonica, S.A., Madrid (ES)

( * ) Notice: Subject to any disclaimer, the term of this patent is extended or adjusted under 35 U.S.C. 154(b) by 78 days.

(21) Appl. No.: 14/116,828

(22) PCT Filed: May 9, 2012

(86) PCT No.: PCT/EP2012/058583
§ 371 (c)(1), (2), (4) Date: Jan. 22, 2014

(87) PCT Pub. No.: WO2012/156255
PCT Pub. Date: Nov. 22, 2012

(65) Prior Publication Data
US 2014/0164765 A1    Jun. 12, 2014

(30) Foreign Application Priority Data
May 13, 2011    (ES) .................................. 201130777

(51) Int. Cl.
*H04L 29/06* (2006.01)
*H04L 9/32* (2006.01)
*H04L 9/30* (2006.01)

(52) U.S. Cl.
CPC ................ *H04L 9/3255* (2013.01); *H04L 9/30* (2013.01)

(58) Field of Classification Search
CPC .............................. H04L 9/3255; H04L 9/30
See application file for complete search history.

(56) References Cited

U.S. PATENT DOCUMENTS 5,610,982 A * 3/1997 Micali ........................... 713/157
5,638,447 A * 6/1997 Micali ........................... 713/180

(Continued)

FOREIGN PATENT DOCUMENTS

JP          3-82240  A       4/1991

OTHER PUBLICATIONS

Jan Camenisch, "Efficient Group Signature Schemes for Large Groups", Advances in Cryptology—Crypto '97, Aug. 17-21, 1997, pp. 410-424, vol. CONF 17.

*Primary Examiner* — Jeffrey Pwu
*Assistant Examiner* — William Corum, Jr.
(74) *Attorney, Agent, or Firm* — Sughrue Mion, PLLC

(57) ABSTRACT

Procedure for a multiple digital signature
It comprises:
  i) generating, by a Trusted Third Party (T), a private key for each signer or member ($F_1, F_2, \ldots, F_t$) of a group of signers (G);
  ii) generating, each of said signers ($F_1, F_2, \ldots, F_t$), a partial signature of a document (M) using their private keys;
  iii) generating a multiple signature from said partial signatures; and
  iv) verifying said multiple signature.
It further comprises generating, by the Trusted Third Party (T), a common public key for all of said signers ($F_1, F_2, \ldots, F_t$) and using said common public key for performing said multiple signature verification of iv).

9 Claims, 5 Drawing Sheets

(56) References Cited

U.S. PATENT DOCUMENTS

| | | |
|---|---|---|
| 7,139,910 B1* | 11/2006 | Ainsworth et al. ........... 713/155 |
| 2003/0120931 A1* | 6/2003 | Hopkins et al. ............... 713/180 |
| 2004/0111607 A1* | 6/2004 | Yellepeddy ................... 713/155 |
| 2013/0326602 A1* | 12/2013 | Chen ................................. 726/6 |

* cited by examiner

PROCEDURE FOR A MULTIPLE DIGITAL SIGNATURE

This application is a National Stage of International Application No. PCT/EP2012/058583 filed May 9, 2012, claiming priority based on Spanish Patent Application No. P201130777 filed May 13, 2011, the contents of all of which are incorporated herein by reference in their entirety.

FIELD OF THE ART

The present invention generally relates to a procedure for a multiple digital signature, based on the generation of a multiple signature from partial signatures and the verification thereof, and more particularly to a method comprising using a common public key for performing said verification.

PRIOR STATE OF THE ART

There are currently different methods and algorithms to perform, in a safe way, electronic or digital signatures by means of computer networks. Most of these protocols are based on Public Key Cryptography (PKC), (see [MOV97]). The main feature of this kind of cryptography is that each individual has two keys, one public key, called e, and one private key, called d. The public key allows any user to encrypt the messages addressed to the owner of the key, by using an encryption procedure, E. Therefore, this key is publicly known. On the other hand, the private key is only known by its owner and it is the one which allows decrypting the received encrypted messages, through a decryption procedure, D.

In general, the only requirement for a public key cryptosystem is that encrypting a message M, with the public key, Ee, followed by its decryption with the private key, Dd, must have as output the original message, i.e., $$Dd(Ee(M))=Dd(c)=M.$$

Considering the case of digital signatures, the encryption and decryption procedures, E and D, on which they are based, must verify additional conditions. One of them is that the encryption procedure performed with the private key, followed by the decryption procedure performed with the respective public key must have as output the original message, i.e., the procedures E and D must verify:

$$De(Ed(M))=De(c)=M.$$

Additionally, to make more efficient the procedures of digital signatures and their electronic transmission, hash functions are used (see [FGHMM04], [MOV97], [NIST02]). These functions are publicly known and allow signing a digest of the original document instead of the whole document. In this document these functions will be denoted by H(•).

The general procedure to perform the digital signature of a document, M, follows the next steps (see FIG. 1):

1. Selection of the public key cryptosystem, (E, D), and the hash function, H, to be used in the procedure.
2. Generation of the public and private keys, e, d, of the user who is to sign the document.
3. Calculation of the digest of the message to sign:

$$H(M)=m.$$

4. Digital signature of the message digest by using the signer's private key:

$$Ed(m)=f.$$

5. Publication of the original document and of its corresponding digital signature: (M, f).
6. Verification and authentication of the signature of the document. This verification is carried out by using the original message, M, and the public key of the sender, e:

$$De(f)=De(Ed(m))=m,$$

$$H(M)=m'$$

$$m' \overset{?}{=} m.$$

The development and the simplicity regarding computer use and internet access for the citizens has led to the emergence of new necessities and requirements that must be satisfied by technology, so that now it should be possible to carry out digital signature protocols not previously considered. This is the case of the multiple signatures.

A multiple signature is a digital signature protocol in which a group of t signers, $$G=\{F_1, F_2, \ldots, F_t\},$$

signs the same document with the idea that the digital signature of the document will only be valid if all of them participate in the protocol (see, for example, [Abo07], [AA07], [BN06], [Boy88], [HK89], [IN83], [KH90], [0091], [Oka88], [PPKW97], [PLL85]).

The easiest way to carry out a multiple signature for a message is to consider as such signature the list formed by all the partial signatures of each one of the signers. However, this signature is not practical since its length is proportional to the number of signers.

In general, most of the multiple signature protocols based on public key cryptosystems are performed in the following way:

1. The signer $F_1$ signs a digest of the original message, calculated from a hash function publicly known. This signature is performed by using the signer private key and following the protocol established by the public key cryptosystem that is being used.
2. Next, each one of the following signers, in an ordered way, signs the document, already signed by the one who is previous in the group, following the same signature protocol already established in the first step.
3. Finally, the last member of the group of signers, $F_t$, signs the corresponding signed document that the previous signer has sent to her. This signature is determined by using her private key and, if needed, with the public key of the verifier. Subsequently, $F_t$ sends to the verifier not only the message but also the multiple signature calculated by the group of signers.

The verification procedure is performed as follows:

1. The verifier receives the message and the multiple signature calculated by the group of signers.
2. The verifier performs the verification of the multiple signature by checking each one of the partial signatures of the group of signers, following the protocol and keeping the order in which they were signed.

There are several inventions related to digital signature methods. None of them has a direct relationship with to the multisignature scheme proposed in this invention.

For example, several patents propose methods to elaborate a digital signature by using public key encryption, such as RSA ([DHM05], [KOKS09]), elliptic curves over finite fields ([Shi01], [TK02]), and by means of bilinear mappings ([Gen10]). Moreover, a group signature method based on ring-signatures is presented in [MFM04] and a digital signature scheme using identity aggregate signatures is presented in [GR10].

Most of previous inventions propose single digital signature methods and they are based on distinct mathematical tools, but all of them are different from the tools used in this invention.

There are other signature schemes proposed for a group of signers. For example, a multi-step signing system is presented in [SFH01]. This method uses multiple signing devices to affix a single signature which can be verified using a single public verification key. In this case, each signing device possesses a share of the signature key and affixes a partial signature in response to authorization from a plurality of authorizing agents. Moreover, this patent does not disclose the use of a private key for each one of the signers, i.e., it is not exactly a multisignature scheme.

The invention presented in [OO01] is a method that enables a verifier to conduct an en-bloc verification of individual, multiple or superimposed signatures electronically attached by a plurality of signers to one or more documents.

These methods, all of them proposed for several signers, can hardly be considered as multisignature schemes.

On the other hand, the invention given in [KOKS09] is based on the RSA public key cryptosystem and it is a true multisignature method whereby a plurality of signers successively perform a signature generating process of a given document to thereby generate one signature. In this case, the signature is computed by using the RSA system. Finally, in [FSNT09], the invention provides a multisignature verification system adding new additional data to original data with a signature attached thereto and verifying the validity of the original data and the additional data.

The paper [WCW96] proposes a multisignature scheme based on the identification of the signers. In this case, each signer has his own public/private key pair, where the public key is obtained from a public information of the signer, in general related to his identity, as his email address, for example.

Other proposal for multisignature schemes has been proposed in [QX10]. In this proposal, the mathematical tool depends on a bilinear map. The proposal is quite theoretical as no efficient and practical implementations of bilinear maps are proposed.

Finally, the patent [ZWW10] discloses a method for protecting security of digital signature documents of multiple verifiers strongly designated by multiple signers, where each signer has his own public key.

PROBLEMS WITH EXISTING SOLUTIONS

The generic protocols described above usually present some deficiencies, such as:
1. It has been already attested that many of the proposed schemes are insecure.
2. They involve a great computational effort.
3. In most of the multiple signature schemes, the signature size of a message grows as the group of signers does, which is not desirable at all.
4. The need that all the signers must be present simultaneously to carry out the signature can cause a delay in the obtaining of the multiple signature.
5. The fact that the multiple signature has to be carried out in a determined order of the group of users forces to verify the signature of each signer following the inverse order.
6. Given a group of signers and a multiple signature for a given message, the multiple signature protocol has to be performed once again by all the members of the group each time one new signer joins the group.
7. In several multiple signature schemes some additional conditions, more restrictive on the signer's keys, are necessary. This is the case for RSA-based schemes ([DHM05], [RSA78]). In these schemes, the RSA module of each signer must grow as the order of each of the signer does. Otherwise, either the signature cannot be performed or it must be divided into blocks and then each one of these blocks must be signed. The fact of signing several blocks involves a larger size of the signature and more computational effort.

As already mentioned, most of the multiple signature schemes are based on public key cryptosystems. The two most widespread cryptosystems nowadays are those whose security is based either on number factorization (RSA [RSA78]), or on the discrete logarithm problem (ElGamal [EIG85], Elliptic curves [HMV04], [Men93]), and so the general features of the multiple signature schemes are based on these systems. In this invention, we will use a slightly different system, which represents a novelty and will give some advantages in comparison with the above mentioned systems.

The first multiple signature scheme was designed by Itakura y Nakamura ([IN83]). Since then no solution to the problem of signing a document jointly in an efficient way had been proposed. In that proposal, a modification of the RSA was performed in such a way that the module considered was the product of three primes instead of just two. Besides, each one of the signers, in order, signs the signature of the signer preceding her in the group, so that the last member of the group is who really computes the signature of the whole group since she signs the result of the signature of all the signers prior to her. To verify the multiple signature, the verifier acts verifying the signature of each signer of the group in the correct order.

Okamoto ([Oka88]) proposed another multiple signature scheme, based also on RSA. In this scheme the signature length is similar to the length obtained from a simple signature scheme, and shorter than the signature obtained from the scheme proposed by Itakura and Nakamura. Moreover, this proposal can be used only if the cryptosystem is bijective; for example, in the case of RSA, but this fact is not verified in cryptosystems based on the discrete logarithm problem.

The scheme of Harn and Kiesler ([HK89]) proposes a modification of RSA which allows a group of users to sign a document and send it to a receiver or verifier, who must be known in advance. In this case, the ciphertext length is fixed and it does not depend on the number of signers of the group. However, the signers must sign the document consecutively; therefore it is necessary to apply several transformations to the partial signatures.

Later on, Kiesler and Harn ([KH90]) proposed other options to solve the limitations that the authors mention in the utilization of the RSA cryptosystem as a digital signature scheme, i.e.: block message bit expansion, module size problem for multiple signatures, and the module problem related to the digital signature, and confidentiality.

In [PPKW97] two schemes improving the ones presented in [Oka88] and [KH90] were proposed. The first one involves an increase in the number of bits in the multiple signature although this increase does not exceed the number of signers. The second scheme does not involve any rise in the number of bits, but every signer is required to have RSA modules with the same number of bits and with the same pattern in the most significant bits, which induces a major flaw in its security.

In order to try to solve some of the previous disadvantages, another proposal is the use of re-blocking ([PLL85]), but this option still shows the problem of keeping the order of the signers.

In [AA07] yet another scheme in which each signer can use a RSA module of different size is proposed. This option produces an increase in the number of bits, but this time, the rise is related to the number of signers and not to the size of the module used.

Regarding multiple signature schemes based on the discrete logarithm problem, it is important to mention the scheme proposed by Laih and Yen ([LY96]). In this scheme, the group of signers must cooperate to sign the message and send it to a given group of verifiers. Then, only the union of all the verifiers is able to validate the multiple signature. Additionally, the signers must use not only their own private keys, but also the public key of all the verifiers. In any case, the use of this scheme is not recommendable as some weaknesses have been detected ([He02], [Yen96]).

Hwang, Chen, and Chang ([HCC98]) designed another multiple signature scheme for a given group of verifiers, which provides authenticity and confidentiality; however, in this scheme, the message can only be retrieved if all the verifiers along with their corresponding multiple signature join together.

Another new scheme (see [ZX04]) allows performing a multiple signature if the verifiers of the signature belong to a previously specified group. Nevertheless, for this scheme some weaknesses have been found too ([LWK05], [YY05]).

In all the previous papers and patents, each signer has a public/private key pair, which is not the case in this proposal. As it was mentioned previously, this multisignature scheme has the property and advantage that each signer has his own private key, but all of them share the same public key. This fact simplifies and spares to a great extend the aforementioned problems related to the computational effort for computation, bandwidth, and, therefore, the overall efficiency of the proposed protocol.

Finally, a paper of high interest is the one published by Bellare and Neven ([BN06]), since the authors present a general multiple signature scheme for a generic model of public key. Since its publication, this proposal has been considered an essential reference for multiple signature schemes. Nevertheless, in this model some requirements have been considered as mandatory, such as the following:

Each one of the signers must have a certified public key, with its corresponding private key, which must be generated by the signer herself.

The signers must interact in a given number of rounds. In each round each signer receives a message, performs several calculations and sends another message to the next signer.

It must be computationally infeasible to forge a multiple signature if there exists one honest signer.

So far, no efficient scheme nor patent, capable of solving all of the above-mentioned problems have been proposed, i.e., no scheme with the following requirements has been designed:

1. Security.
2. Efficiency.
3. Independence of the size of the multiple signature with respect to the number of signers.
4. Possibility of off-line signature, i.e., not all the signers must be on-line simultaneously.
5. Signing of the message by all the signers in any order.
6. Simplicity in the procedure to add new signers.
7. Simplicity in the multiple signature verification procedure (no need to verify the partial signature of each member of the group of signers).

DESCRIPTION OF THE INVENTION

It is necessary to offer an alternative to the state of the art that overcomes the above mentioned problems from which existing solutions suffer.

To that end, the present invention provides a procedure for a multiple digital signature, comprising:
  i) generating, by a Trusted Third Party, a private key for each signer or member of a group of signers;
  ii) generating, each of said signers, a partial signature of a document using their private keys;
  iii) generating a multiple signature from said partial signatures; and
  iv) verifying said multiple signature.

On contrary to known proposals, the procedure of the invention comprises generating, by said Trusted Third Party, a common public key for all of said signers and using said common public key for performing said multiple signature verification of iv).

This procedure allows generating the keys of a Trusted Third-Party, who will generate the common public key and the private keys of a determined group of users. These users will jointly sign a document in such a way that the signatures of all the members of the group will constitute the multiple signature of such group for the given document.

Once the multiple signature is performed, anyone knowing the common public key of the group of users will be able to verify the authentication of the multiple signature or else declare it invalid.

The present invention is based on a new multiple signature scheme, neither proposed nor published before, which verifies all the requirements mentioned above. Therefore, it guarantees that all the problems described in the previous chapter are solved in an accurate way.

It is remarkable that this new scheme does not match the model proposed in [BN06] since the procedure is carried out in just one round in which all the signers participate. Moreover, each signer does not need to have her own certified pair of keys (public and private). In fact, in the protocol proposed in this invention all the signers share the same public key, but each one has a different private key, which is kept in secret and that is only known by herself and by the Key Generator Center or Trusted Third-Party.

In particular, two different protocols to obtain a multiple signature for a document are proposed. The first one, which requires a Trusted Third-Party not only for generating the keys but also to perform the multiple signature, is more efficient than the second one, which does not need a Trusted Third-Party to perform the signature.

As it was mentioned in the Prior State of the Art section, the general scheme of the devices carrying out the multiple signature procedure considers the following steps (see FIG. 2):

1. Generation of keys by a Trusted Third-Party.
2. Verification of the signer's keys.
3. Generation of the multiple signature by means of the partial signature of each member of the group of signers.
4. Verification of the multiple signature.

In this invention, a procedure to carry out the processes of key generation, multiple signature generation and multiple signature verification is presented.

This invention not only guarantees the generation of a multiple digital signature of a document by a group of signers, but also substantially improves other previously published protocols in many different ways. For instance, it is easier to use, computationally more efficient and it allows time and bandwidth savings.

Other embodiments of the procedure of the invention, for some of which the collaboration of the Trusted Third Party is required while for others it is not, are described according to appended claims, and in a subsequent section related to the detailed description of several embodiments.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF SEVERAL EMBODIMENTS

Let $\{F_1, F_2, \ldots, F_N\}$ be a group of N users, a multiple digital signature is a procedure through which every subgroup of t members of it, $$G=\{F_1, F_2, \ldots, F_t\},$$

can, at any moment, perform, through a specified protocol, a common signature of a document or of a previously fixed message. Additionally, such signature can be verified and validated by any other user. To carry out the verification it is necessary to know the number of users, t, the original document or a digest of such message generated by a hash function, m, the multiple signature, and the public key(s) used in the protocol.

As it was previously mentioned, these digital signature protocols need a Key Center or a Trusted Third-Party, T, which generates both its own keys and the keys of each one of the signers.

In this proposal, two protocols to perform the signature will be described. The two protocols provide the same multiple signature every time the same inputs of the protocol are used. Therefore, both are essentially the same, although they have some differences regarding the actions that both the Trusted Third-Party and the users who participate in the protocol carry out.

On the other hand, the Trusted Third-Party, T, can be part of the group of signers or not, affecting neither the signature procedure nor the multiple signature itself.

Figure 1:
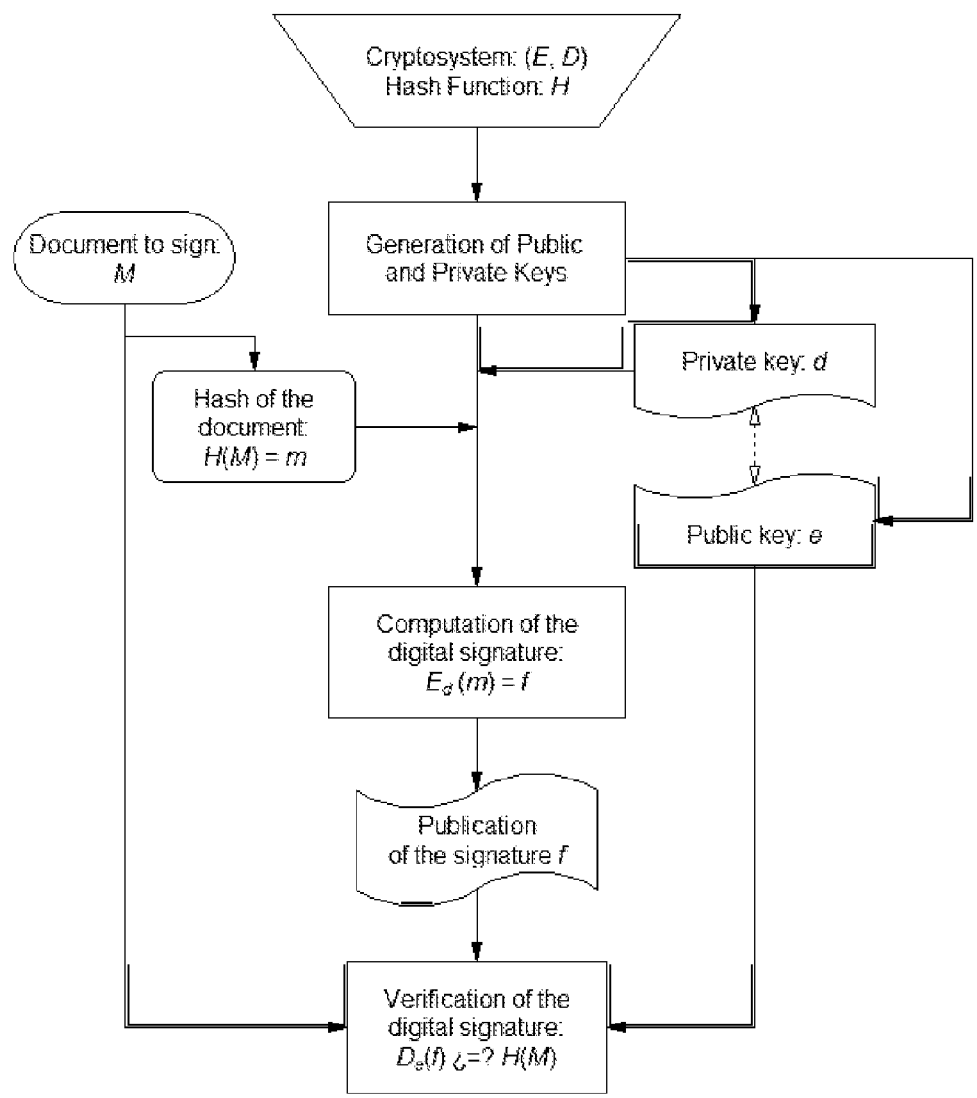
FIG. 1 shows a general scheme of a digital signature procedure representative of the protocol of a standard digital signature procedure.
Figure 2:
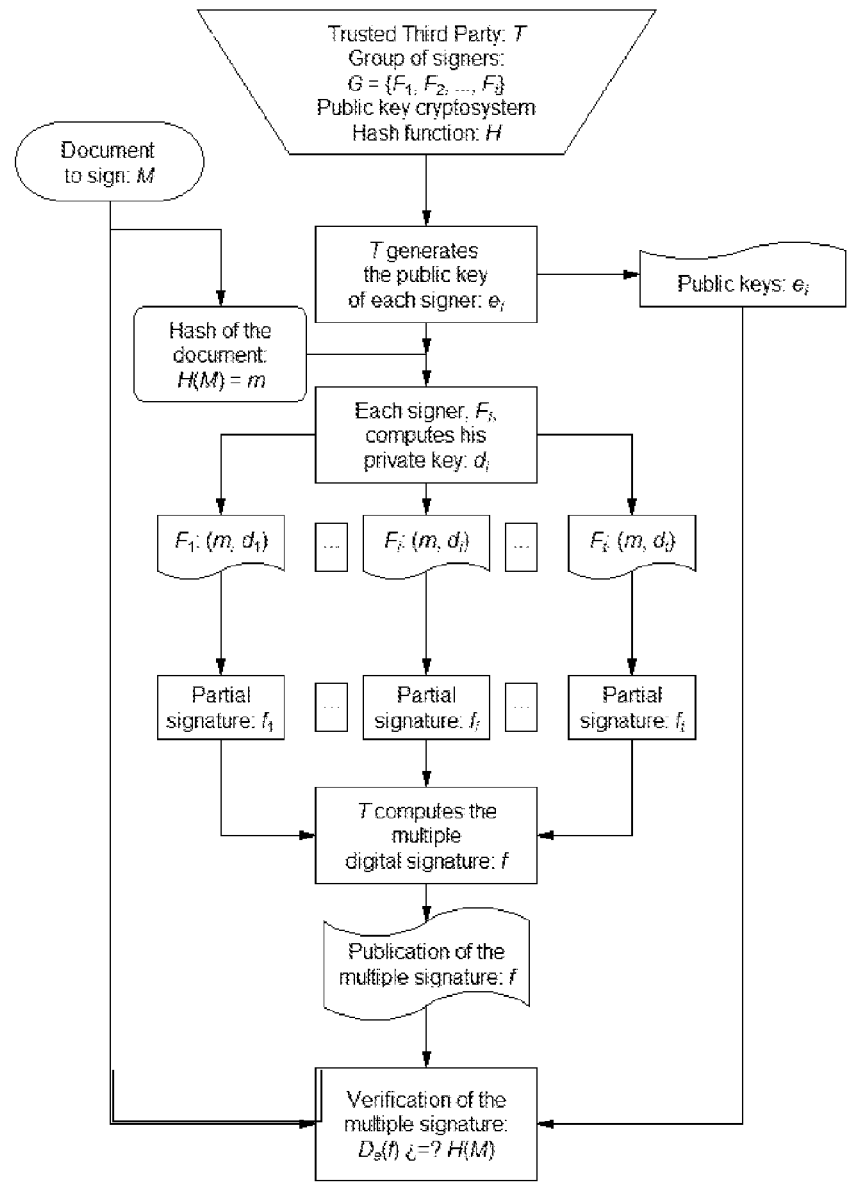
FIG. 2 is a flow diagram which illustrates an standard procedure used to perform a multiple signature.
Figure 3:
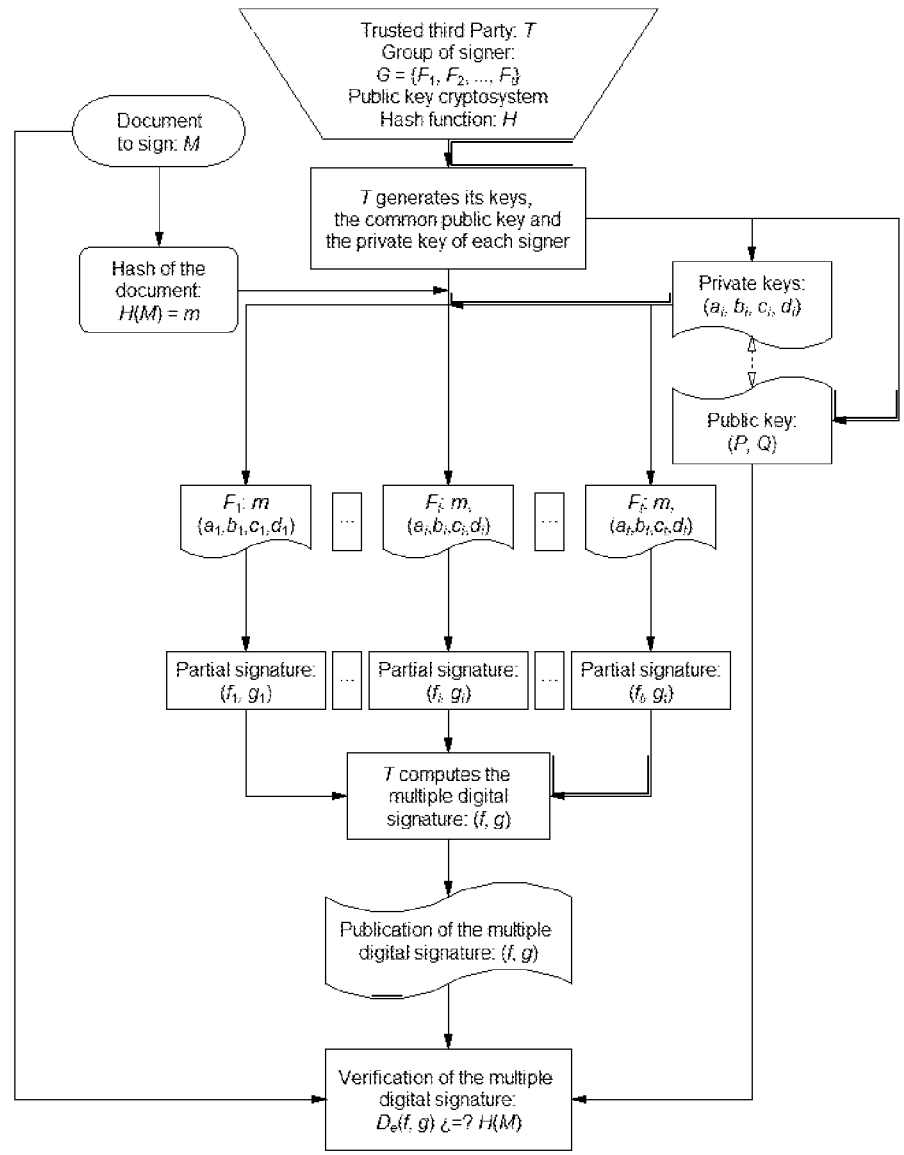
FIG. 3 illustrates, by means of a flow diagram, an embodiment of the procedure of the invention which a Trusted Third Party is used to perform the multiple signature.

The phases in which this protocol is divided are the following (see FIGS. 3-4):
1. Key generation.
2. Key verification.
3. Generation of the multiple digital signature.
  a) With the collaboration of T.
  b) Without the collaboration of T.
4. Multiple digital signature verification.

Next, each one of the phases is described in more detail:
1. Key Generation
First of all, the key of T and then the keys of the signers, must be generated. The steps to generate the key of T are the following:
1. T chooses two large prime numbers p and q, which must verify the following conditions:

$$p=u_1 \cdot r \cdot p_1+1,$$

$$q=u_2 \cdot r \cdot q_1+1,$$

where $r$, $p_1$, $q_1$ are prime numbers and $u_1$, $u_2$ even integer numbers, whose greatest common divisor (gcd) is $$gcd(u_1, u_2)=2,$$

i.e., $u_1=2 \cdot v_1$ and $u_2=2 \cdot v_2$.
2. T calculates $$n=p \cdot q,$$

$$\phi(n)=(p-1)(q-1)=u_1 \cdot u_2 \cdot r^2 \cdot p_1 \cdot q_1,$$

$$\lambda(n)=lcm(p-1, q-1)=2v_1 \cdot v_2 \cdot r \cdot p_1 \cdot q_1,$$

where lcm represents the least common multiple, $\phi(n)$ is the Euler function and $\lambda(n)$ is the Carmichael function.

To guarantee the security of the protocol, the size of r, i.e., its bitlength, must be sufficiently large so as to render computationally infeasible the Subgroup Discrete Logarithm Problem (SDLP), with order r of the integers module n, $\mathbb{Z}_n^*$.
3. Next, T chooses an integer number $a \in \mathbb{Z}_n^*$ with multiplicative order r, module n, and meeting the condition $$gcd(a, \phi(n))=gcd(a, u_1 \cdot u_2 \cdot r^2 \cdot p_1 \cdot q_1)=1.$$

Let $S_r$ be the subgroup of $\mathbb{Z}_n^*$ generated by a. Obtaining the generator a can be carried out in an efficient way, i.e., in a polynomial time, just by following Lemma 3.1 of

[Sus09].

Indeed, according to this lemma, the first step is to determine an element $g \in \mathbb{Z}_n^*$ whose order is $\lambda(n)$. The procedure consists in choosing an element $g \in \mathbb{Z}_n^*$ and in verifying that g raised to all the possible divisors of $\lambda(n)$, module n, is different from 1 in all cases. This procedure is fast since the factorization of $\lambda(n)$ is known and it has only a few prime factors, so the list of its divisors can be easily computed. In case that the randomly chosen element does not verify this condition, another one has to be chosen and the procedure is performed again.

Once the element g with order $\lambda(n)$ is determined, the next step is to calculate the element $$\alpha=g^{2v_1 \cdot v_2 \cdot p_1 \cdot q_1} (\bmod n)$$

4. T generates a random secret number s in $S_r$ and calculates $$\beta=\alpha^s (\bmod n).$$

5. The values ($\alpha$, r, $\beta$, n) are made public, whereas T keeps the values (p, q, s) in secret.

Though the factor r of p−1 and q−1 is known and n is the product of two primes, p and q, currently there is no efficient algorithm capable of calculating the two factors of n.

The steps followed by T for generating the keys of the signers are:

1. T determines its private key generating randomly four integer numbers $$a_0, b_0, c_0, d_0 \in \mathbb{Z}_r.$$

2. T obtains the common public key for all the signers computing $$P = \alpha^{a_0} \cdot \beta^{b_0} (\bmod\ n),$$

$$Q = \alpha^{c_0} \cdot \beta^{d_0} (\bmod\ n),$$

3. From the expressions above, T determines $$P = \alpha^{a_0} \cdot \beta^{b_0} (\bmod\ n) = \alpha^{a_0 + s \cdot b_0} (\bmod\ n),$$

$$Q = \alpha^{c_0} \cdot \beta^{d_0} (\bmod\ n) = \alpha^{c_0 + s \cdot d_0} (\bmod\ n),$$

Therefore, both P and Q are elements of the subgroup $S_r$; i.e., there exist integer numbers h, $k \in \mathbb{Z}_r$, verifying $$h = (a_0 + s \cdot b_0)\ (\bmod\ r),$$

$$k = (c_0 + s \cdot d_0)\ (\bmod\ r).$$

4. T determines the private key for each signer $F_i \in G$, with $i = 1, \ldots, t$, generating four integer numbers for each one of them, $$a_i, b_i, c_i, d_i \in \mathbb{Z}_r,$$

so that the signers will share the same public key (P, Q). Hence, for the values of $i = 1, \ldots, t$, the following two conditions must hold $\mathbb{Z}_r$, $$h = (a_i + s \cdot b_i)\ (\bmod\ r),$$

$$k = (c_i + s \cdot d_i)\ (\bmod\ r),$$

or equivalently $$a_i = (h - s \cdot b_i)\ (\bmod\ r), \quad (1)$$

$$c_i = (k - s \cdot d_i)\ (\bmod\ r). \quad (2)$$

Therefore, as T knows the values s, h and k, it determines t private keys for the signers $F_i$ just by generating t pairs of random numbers $b_i, d_i \in \mathbb{Z}_r$ and then calculating the corresponding values $a_i, c_i \in \mathbb{Z}_r$ following the previous equations (1) and (2).

Once T has calculated the private keys, it distributes them in a secure way to the signers.

2. Key Verification

To verify that the key of T is correct, each signer, $F_i \in G$, $i = 1, \ldots, t$, only has to check if:

$$a \neq 1 (\bmod\ n),$$

$$a' = 1 (\bmod\ n).$$

Moreover, each signer must check if the known public key corresponds to her private key. To do this, each signer only has to verify if these two following equations hold $$P = \alpha^{a_i} \cdot \beta^{b_i} (\bmod\ n),$$

$$Q = \alpha^{c_i} \cdot \beta^{d_i} (\bmod\ n).$$

To perform the multiple digital signature, two scenarios are considered, depending whether the Trusted Third Party T collaborates with the group of signers or not.

The first case, namely, when the multiple signature is performed with the collaboration of T, is faster, more efficient, and secure than the second one.

3a. Multiple Digital Signature Performed with the Collaboration of T

In this protocol (see FIG. 3), each one of the signers performs her particular signature for the digest of the message, m, and sends it, in a secure way, to T, which is in charge of performing the multiple signature. To do so, firstly it has to verify the validity of all the signatures received and then add all of them, modulo r.

1. Each signer $F_i \in G$, $i = 1, \ldots, t$, calculates her signature as follows:

$$f_i = a_i + c_i \cdot m (\bmod\ r),$$

$$g_i = b_i + d_i \cdot m (\bmod\ r).$$

2. Signer $F_i$ sends, in a secure way, her signature to T.

3. T verifies the validity of each one of the received signatures by checking if $$P \cdot Q^m (\bmod\ n) = \alpha^{f_i} \cdot \beta^{g_i} (\bmod\ n), i = 1, \ldots, t.$$

4. Once all the signatures are verified, T calculates the multiple signature for the document m, (f, g), just by adding all the partial signatures:

$$f = \Sigma_{i=1, \ldots, t} f_i (\bmod\ r),$$

$$g = \Sigma_{i=1, \ldots, t} g_i (\bmod\ r).$$

5. Finally, T publishes (f, g) as the multiple signature of G to m.

3b. Multiple Digital Signature Performed without the Collaboration of T

Figure 4:
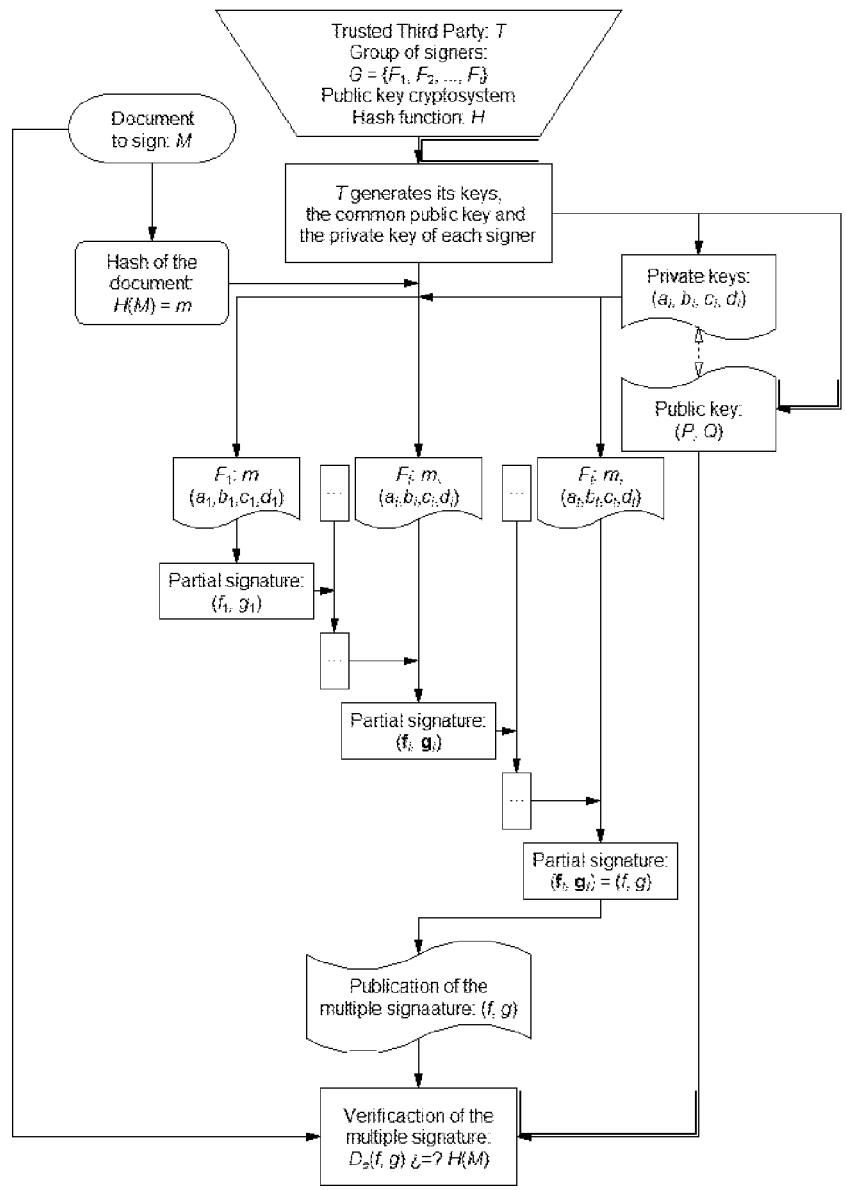
FIG. 4 is a flow diagram which illustrates an embodiment of the procedure of the invention for which does not require the collaboration of a Trusted Third Party to perform the multiple signature.

It is possible to perform the multiple signature of m without the collaboration of T, but in this case the procedure is not as straightforward as the previous one (see FIG. 4). In this procedure each signer signs the signature of the previous one, so it is necessary to broadcast the partial signatures among the group of signers and to establish an order in the group of signers in order to avoid possible attacks by a signer or a conspiracy of several signers.

When T was collaborating to perform the multiple signature, the partial signatures could be performed off-line, i.e., each signer could perform her signature in any moment without the necessity of all of them to be connected at the same time. For the present case, all the signers must be connected simultaneously and the signature is performed in just one act. There is no need to wait for the calculation of each signer's signature.

Let $G = \{F_1, \ldots, F_t\}$ be the group of signers in an arbitrary fixed order.

In this case, instead of being the Trusted Third-Party the one who verifies the signature of all the signers, each signer herself verifies the signature of the previous signer. Then, she performs her own signature and adds it to the signature received. More precisely, the procedure is the following:

1) The first signer, $F_1$, performs her signature for the digest of a given message, m, calculating $$f_1 = a_1 + c_1 \cdot m (\bmod\ r),$$

$$g_1 = b_1 + d_1 \cdot m (\bmod\ r)$$

and sends $(f_1, g_1)$ to the group of signers.

2) The second signer, $F_2$:

a) Verifies the signature of $F_1$ checking if $$P \cdot Q^m = \alpha^{f_1} \cdot \beta^{g_1} (\bmod\ n).$$

b) Calculates the partial accumulate signature for the message, computing $$f_2 = f_1 + a_2 + c_2 \cdot m (\bmod\ r) = a_1 + a_2 + (c_1 + c_2) m (\bmod\ r),$$

$$g_2 = g_1 + b_2 + d_2 \cdot m (\bmod\ r) = b_1 + b_2 + (d_1 + d_2) m (\bmod\ r).$$

c) Sends $(f_2, g_2)$, as the partial accumulate signature to the group of signers.

3) The signer $F_3$ receives the partial signature $(f_2, g_2)$ and a) Verifies the partial signature of $F_2$ checking if $$P^2 \cdot Q^{2m} = \alpha^{f_2} \cdot \beta^{g_2} \pmod{n}.$$

b) Calculates her own partial accumulate signature for the message, computing $$f_3 = f_2 + a_3 + c_3 \cdot m \pmod{r} = a_1 + a_2 + a_3 + (c_1 + c_2 + c_3)m \pmod{r},$$

$$g_3 = g_2 + b_3 + d_3 \cdot m \pmod{r} = b_1 + b_2 + b_3 + (d_1 + d_2 + d_3)m \pmod{r}.$$

c) Sends $(f_3, g_3)$ to the group of signers as her partial signature.

...

i) The signer $F_i$ uses the partial signature of $F_{i-1}$, $(f_{i-1}, g_{i-1})$, and a) Verifies it, by checking $$P^{i-1} \cdot Q^{(i-1)m} = \alpha^{f_{i-1}} \cdot \beta^{g_{i-1}} \pmod{n}.$$

b) Calculates her partial accumulate signature for the message, computing $$f_i = f_{i-1} + a_i + c_i \cdot m \pmod{r} = a_1 + \ldots + a_i + (c_1 + \ldots + c_i)m \pmod{r},$$

$$g_i = g_{i-1} + b_i + d_i \cdot m \pmod{r} = b_1 + \ldots + b_i + (d_1 + \ldots + d_i)m \pmod{r}.$$

c) Sends $(f_i, g_i)$ to the group of signers.

...

t) The last signer, $F_t$ a) Verifies the partial signature of $F_{t-1}$ checking if $$P^{t-1} \cdot Q^{(t-1)m} = \alpha^{f_{t-1}} \cdot \beta^{g_{t-1}} \pmod{n}.$$

b) Calculates her partial accumulate signature for the message, computing $$f_t = f_{t-1} + a_t + c_t \cdot m \pmod{r} = a_1 + \ldots + a_t + (c_1 + \ldots + c_t)m \pmod{r},$$

$$g_t = g_{t-1} + b_t + d_t \cdot m \pmod{r} = b_1 + \ldots + b_t + (d_1 + \ldots + d_t)m \pmod{r}.$$

c) Publishes the multiple signature for m: $(f, g) = (f_t, g_t)$.

The condition that must satisfy the partial signature of the signer $F_{i-1}$ carried out by the signer $F_i$ is hold since:

$$\alpha_{i-1}^f \cdot \beta_{i-1}^g \pmod{n} =$$

$$\alpha^{a_1+\ldots+a_{i-1}+(c_1+\ldots+c_{i-1})m} \cdot \beta^{b_1+\ldots+b_{i-1}+(d_1+\ldots+d_{i-1})m} \pmod{n}$$

$$= \alpha^{a_1+\ldots+a_{i-1}+(c_1+\ldots+c_{i-1})m} \cdot \beta^{b_1+\ldots+b_{i-1}+(d_1+\ldots+d_{i-1})m} \pmod{n}$$

$$= \prod_{j=1}^{i-1} \alpha^{a_j} \cdot \beta^{b_j} (\alpha^{c_j} \cdot \beta^{d_j})^m \pmod{n}$$

$$= \prod_{j=1}^{i-1} P \cdot Q^m \pmod{n}$$

$$= P^{i-1} \cdot Q^{(i-1)m} \pmod{n}.$$

The verification of all the partial accumulated signatures performed by each of the signers (except the first one) is mandatory: no signer should sign a message without having checked the validity of the signature performed up to that moment. By doing so and given that all the signers are honest, in most cases, additional verifications are avoided. Actually, each signer can act as the verifier and can verify the multiple signature using the multiple signature and the common public key since they are known by all the signers.

If either the final multiple signature or any of the partial accumulated signatures did not satisfy one or more verification tests, it would be known that, at least, one of the signers has forged her signature or that some kind of conspiracy among several signers has taken place. The reason why all the partial accumulate signatures must be broadcast to the whole group is to know exactly where the forgery has happened. At that moment, the problem would be to decide which signer is the forger. Since the whole group knows the partial signatures, the only task to do is to subtract consecutive pairs of signatures and to verify the signature of the corresponding signer.

Broadcasting the partial signatures inside the group of signers balances advantages and disadvantages among them, since, for example, any partial accumulate signature is verified just by one signer, not by all. Furthermore, the signature of the last signer is not verified by any of the rest of signers and the first signer sends her signature directly, without having been added to any other.

It is important to point out that the multiple signatures obtained from the two procedures explained, with or without the collaboration of T, match up. Therefore, the multiple signature verification of the first procedure applies also to the second one.

4. Multiple Signature Verification

Let $(f, g)$ be a multiple digital signature for a digest of a message, m, performed by the following group of t users:

$$G = \{F_1, \ldots, F_t\}.$$

To verify the validity of such signature the procedure is the following, irrespective of whether the signature was performed with or without the collaboration of the Trusted Third-Party.

The multiple signature of the group G, with t members, for m is valid if the following condition holds $$P^t \cdot Q^{t \cdot m} = \alpha^f \cdot \beta^g \pmod{n}.$$

Actually, it is sufficient to bear in mind that $$\alpha^f \cdot \beta^g \pmod{n} = \alpha^{a_1+\ldots+a_t+(c_1+\ldots+c_t)m} \cdot \beta^{b_1+\ldots+b_t+(d_1+\ldots+d_t)m} \pmod{n}$$

$$= \alpha^{a_1+\ldots+a_t+(c_1+\ldots+c_t)m} \cdot \beta^{b_1+\ldots+b_t+(d_1+\ldots+d_t)m} \pmod{n}$$

$$= \prod_{j=1}^{t} \alpha^{a_j} \cdot \beta^{b_j} (\alpha^{c_j} \cdot \beta^{d_j})^m \pmod{n}$$

$$= \prod_{j=1}^{t} P \cdot Q^m \pmod{n}$$

$$= P^t \cdot Q^{t \cdot m} \pmod{n}.$$

Figure 5:
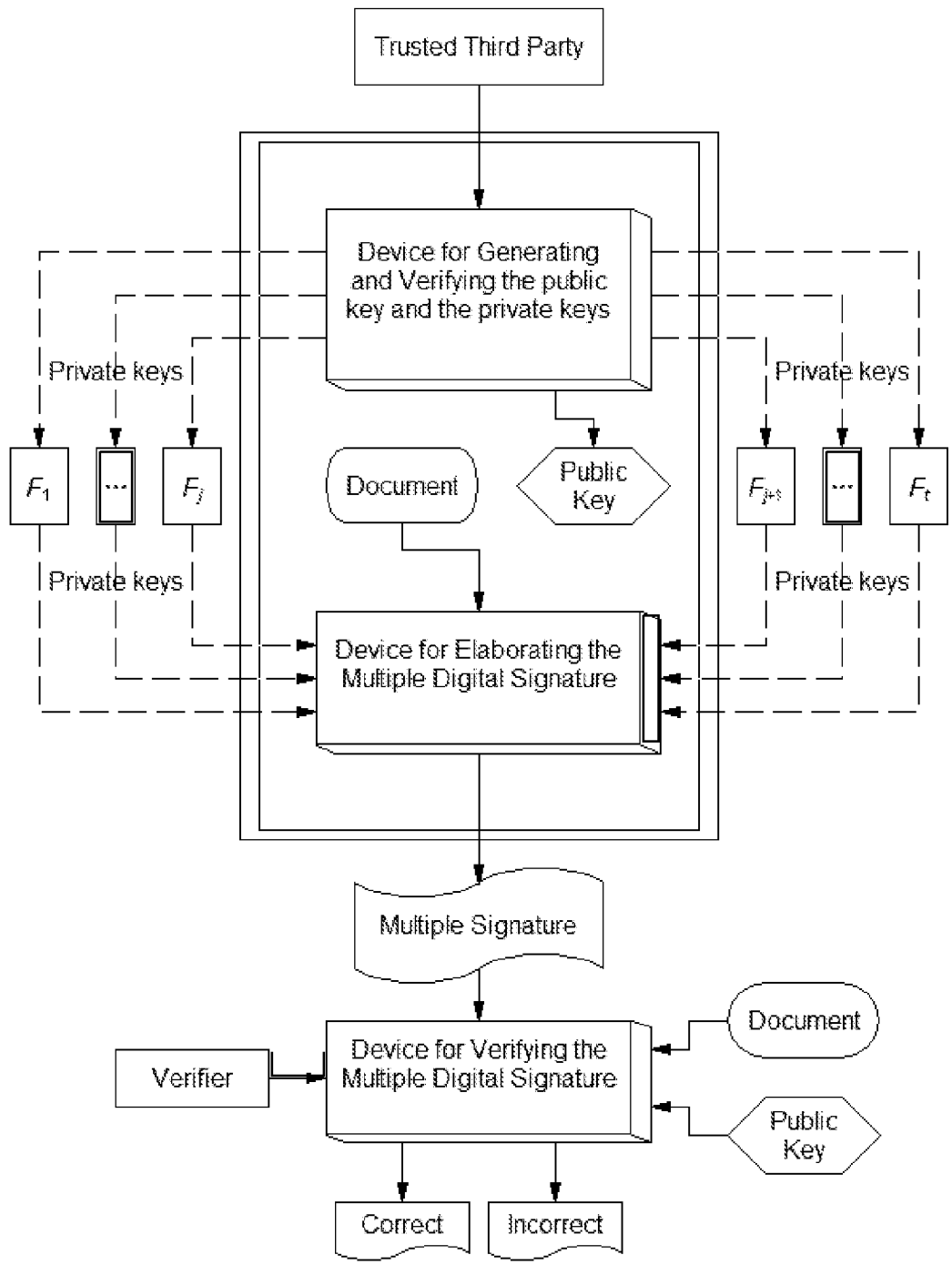
FIG. 5 shows an architecture implementing the procedure of the invention for an embodiment.

The global design for the architecture of the proposed procedure in this invention is shown in FIG. 5.

ADVANTAGES OF THE INVENTION

It can be seen that both the multiple signature verification procedure and the partial signature verifications are similar to the procedure used in the classic scheme of ElGamal ([EIG85], [FGHMM04]). This fact increases the confidence in the security of this proposal. Nevertheless, this similarity is not an equivalence, since the scheme of this invention is new and does not follow the same patterns as other schemes already published.

Indeed, in this invention, the signature is verified by checking if the following equation holds:

$$\alpha^f \cdot \beta^g (= \alpha^f \cdot (\alpha^s)^g) \stackrel{?}{=} P \cdot Q^m \pmod{n}.$$

However, the signature verification in ElGamal scheme uses the following equation $$(\alpha^a)^r \cdot (\alpha^h)^s \stackrel{?}{=} \alpha^m \pmod{p}.$$

In both expressions all the parameters are known by the signature verifier; and m, in both expressions, is the digest of the message whose signature is to be verified.

The similarity of both verifications lies in the fact that in both expressions the goal is to check an equality using the digest of the message as the exponent of a public parameter.

Additional advantages of the present scheme are:
1. The length of the signature is always the same, irrespective of the size of the message or of the number of signers. Moreover, the signature is short, since the pair (f, g) are two elements of the subgroup $S_r$ of $\mathbb{Z}_n^*$.
2. The computational time of all the operations is polynomial.
3. If the Trusted Third-Party takes part in the protocol, each signer calculates her signature at her own accord; the signers are not expected to be on-line at the same time. Once T has received all the partial sums, it will determine the multiple signature.
4. Furthermore, when T collaborates in the protocol, there is no hindrance in adding new signers to the original group of signers at any moment without having to perform the whole protocol one more time. The only task that the new-comers have to do is to calculate their corresponding signatures and send them to T. Then, T will verify these signatures and will compute the new multiple signature by adding the new signatures to the original multiple signature.
5. If the protocol is performed without the collaboration of T, the signers must be on-line simultaneously, so the multiple signature can be performed in just one act. In this way it is not necessary to wait to all the signers to calculate, in an established order, their partial accumulate signature.
6. It is also possible to add new signers to the procedure when T does not collaborate without having to perform the whole protocol once more. In this case the new signers have just to order themselves randomly after the last signer of the original group and calculate their accumulate signatures using the last known signature.
7. The multiple signature verification in both protocols is very simple and efficient, since only one computation is necessary. This calculation allows the validation of all the partial signatures of all the members of the group.

Multiple Signature Security

In case of using the protocol where T is collaborating, there is no possibility for two signers to conspire for generating a false signature since the multiple signature is determined by the Trusted Third-Party and in the procedure it verifies that each one of the partial signatures correspond to each one of the signers.

If the protocol is carried out without the collaboration of T, a conspiracy among two or more signers is not possible since all the signers take part in the protocol and each one verifies the signature of the previous signer. Besides, if any of the signers had any suspicion of possible conspiracies or forged signatures, she could verify each and every one of the partial signatures because all the partial accumulated signatures are broadcast to all the members of the group. In this way, both the forgery and the culprit can be easily detected.

On the other hand, no signer can determine the secret value s chosen by T only by knowing her private key and the common public key. It has to be pointed out that determining s from the parameters $\alpha$ and $\beta = \alpha^s \pmod{n}$ involves the computation of discrete logarithms in the subgroup, $S_r$, of order r, generated by $\alpha$. This fact is impossible since r was chosen in such a way that this problem was infeasible in $S_r$.

If two, or more, signers, for example, $F_i$ and $F_j$, conspire to obtain the secret value s of T, they can determine their corresponding partial signatures for a given message, $(f_i, g_i)$ and $(f_j, g_j)$, respectively. Since the following equation holds $$P \cdot Q^m \pmod{n} = \alpha^{f_i} \beta^{g_i} \pmod{n} = \alpha^{f_j} \cdot \beta^{g_j} \pmod{n}, \quad (3)$$

they can perform the following calculation:

$$\alpha^{f_i} \cdot \beta^{g_i} \pmod{n} = \alpha^{f_j} \cdot \beta^{g_j} \pmod{n},$$

$$\alpha^{f_i + s g_i} \pmod{n} = \alpha^{f_j + s g_j} \pmod{n},$$

However, as a is an element of order r, the following expression holds:

$$f_i - f_j = s(g_j - g_i) \pmod{r}, \quad (4)$$

$$s' = s \pmod{r} = (f_i - f_j)(g_j - g_i)^{-1} \pmod{r}. \quad (5)$$

Nevertheless, after these calculations, the signers will only obtain the value of $s' = s \pmod{r}$ and not the real value of s. Therefore, this kind of attack does not impair the security of the protocol.

Using the same hypothesis, if several signers want to break the system and to calculate s by signing different messages, chosen by themselves or randomly, trying to obtain more information about the protocol and to break it, they would not obtain more information than the one obtained from signing a single message.

Actually, suppose that two signers, $F_i$ and $F_j$, choose two different messages, for example, $m_1$ and $m_2$, and calculate their corresponding signatures for each one of them. Let $(f_i, g_i)$ and $(h_i, k_i)$ be the signatures of $F_i$ for such messages, and let $(f_j, g_j)$ and $(h_j, k_j)$ be the corresponding signatures of $F_j$.

In this case, using the expression (3) for each message, the following equations hold:

$$P \cdot Q^{m_1} \pmod{n} = \alpha^{f_i} \cdot \beta^{g_i} \pmod{n} = \alpha^{f_j} \cdot \beta^{g_j} \pmod{n},$$

$$P \cdot Q^{m_2} \pmod{n} = \alpha^{h_i} \cdot \beta^{k_i} \pmod{n} = \alpha^{h_j} \beta^{k_j} \pmod{n},$$

where, as it happens in (4), it can be obtained:

$$f_i - f_j = s(g_j - g_i) \pmod{r},$$

$$h_i - h_j = s(k_j - k_i) \pmod{r},$$

therefore, as it happens in (3), the result is $$s' = s \pmod{r} = (f_i - f_j)(g_j - g_i)^{-1} \pmod{r} = (h_i - h_j)(k_j - k_i)^{-1} \pmod{r}$$

and the value obtained for s' is the same as the one obtained when just a message is used.

APPLICATIONS OF THE INVENTION

The invention can be successfully applied when digital signatures are compulsory but several entities or people must jointly sign the same document, message, contract, etc. Among other applications, the following can be mentioned:
  Any process requiring a digital signature where more than one signer is involved.
  Digital signatures in corporate scenarios for signing contracts between companies or between a company and a client.

Digital signatures between companies or users and the government and public administrations.

Digital signatures used for contracts with several members.

Digital signatures for agreements or minutes between different organizations.

These applications are very useful in environments related to these activities:

Government and public administration (local, regional or national). In particular, it is well known that the Spanish Trade, Tourism and Industry Ministry has developed an application, called eCoFirma, to perform and verify digital signatures. Moreover, this project implements the validation of files composed by multiple signatures (http://oficinavirtual.mityc.es/javawebstart/soc_info/ecofirma/index.html). This application uses digital certificates, therefore it uses RSA keys. As it is known, these keys are large and make the file which contains the signature grow as more signatures are added. With our proposal, the multiple signature can be performed in a more efficient way and therefore the validation procedure is faster, although the keys used have a very different origin, as it was previously mentioned.

Business. In this case, it is possible that different companies belonging to a specific group, or different people from a committee, use this proposal to sign in a multiple way certain documents or agreements that everyone abide.

Affidavit. Most legal documents need the signatures of all the members involved (buy-sale, mortgage, divorces, heir declaration, and so on), as well as notary attestation of the document. This proposal can be used as a reliable and secure application to carry out these classes of processes.

Banking. As it is case with legal processes, banking procedures, in many situations, to sign documents where several parties are involved, including the bank entity itself. In this case, it is also possible the use to this invention.

Military. In military environments, it is possible that some decisions must be carried out following a predetermined order depending on the rank of command. At a certain moment, each one of the authorities involved must sign a determined decision. Each one of these signatures could be carried out by using the multiple signature of each one of the parties involved, though in this case a specific order must be established in the whole process.

Internet. The growing use of Internet could need that two, or more parties, must carry out an on-line agreement. This commitment can be performed by using our proposal of electronic digital procedure. In this way, all the parties involved turn to a Trusted Third-Party to carry out such agreement.

Certification Authorities. In general, certification authorities are necessary to release reliable digital certificates, which comply with the standard X.509.v3. This fact implies the use of large keys (as it happens with RSA keys) and digital signature procedures which, in case of using software to perform multiple signatures, present some problems already mentioned in the present document: a big computational effort, a rise in the size of the files as the number of signers grows, and so on. With our proposal, these certification authorities could develop their own applications and become the Trusted Third-Party that is needed in the invention.

Next, a possible implementation of the whole multiple signature procedure is described, beginning with the key generation until the signature verification, stepping through the generation of the signature. In this implementation the current recommended key sizes will be used in order to avoid possible attacks. Such attacks can be mounted either if it were possible to factorize the module n (Integer Factorization Problem), or if it were possible to solve the Discrete Logarithm Problem, either in the multiplicative subgroup of integer numbers module n or in a subgroup of order r.

Suppose that the group of signers consists of $t=5$ users: $G=\{F_1, F_2, F_3, F_4, F_5\}$ and that T is the Trusted Third-Party.

Key Generation

Following the steps mentioned previously, T generates its own private key and the public key. In order to show an example which can be used in practical applications, with warranties of security, a number r with 192 bits has been generated, which makes the discrete logarithm problem infeasible in a subgroup of order r. Besides, the prime numbers p and q have been generated to have, approximately 512 bits each one, which means that n has around 1024 bits. This size is big enough to guarantee its security against the factorization attacks during a reasonable time (the digits of each number has been separated into groups of 10 to improve its legibility).

The calculated values are the following:

$u_1=74=2\cdot 37$, $u_2=188=2\cdot 94$, r=4280023136 1972361770 9720134208 9944684948 9050016803 52659163, $p_1$=3098365935 5115484298 6754567228 9635523537 4615761798 4830977826 9780185513 2773111664 9369523991 95821, $q_1$=1520450525 2113540207 5164722445 6778025701 0592684151 0042773032 3583726574 4664496833 3500176742 76217, p=9813197637 4121676342 6568482314 0310918044 3735395146 3165527063 6735923149 3320377492 6066484931 1740863445 7483957527 4926886593 9416106694 0401463789 3848791487 8903, q=1223421923 9653928573 7921720553 5181885769 8744000443 3360186341 6722487366 9987835834 7336009802 3419921079 1174748161 9489598922 7394318308 0189542960 9232557889 57749, n=1200568113 3815441777 9200008036 6880591092 5122610186 1101012447 6894157975 4465649221 2596080380 9123496642 1067708087 9742404316 7621962457 4759824948 7705927686 2918453404 3641462423 0810501474 4219629870 8072023173 2433241319 0597257452 8032813795 4341600436 0856910403 2445755423 0802903516 3200102347 0407173383 4836375827 918469347, φ(n)=1200568113 3815441777 9200008036 6880591092 5122610186 1101012447 6894157975 4465649221 2596080380 9123496642 1067708087 9742404316 7621962457 4759824948 7705927686 2918232930 1953755813 4602443617 5434708573 0497711419 2475273645 1549217844 8350881808 0757606170 2561451002 5022063108 6888205287 5617968754 1429750414 5496514084 214632696, λ(n)=1402525261 1697779776 1246015561 0377785768 6729617252 9437752774 8325801441 1744936419 7360621133 0844851766 7090293566 1320231059 3956741493 0846169277 4865387347 5469537220 7724643327 9875093536 1891321645 6744284572 2113021501 6365721481 5842212697 6943090932 1704533099 6.

Subsequently, T determines an element g of the group of the integer numbers module n, $Z_n^*$ whose order is $\lambda(n)$, and then it calculates the element, $\alpha \in Z_n^*$ of order r.

g=6717842480 6844949028 2650889244 7341097607 4856794135 4583987170 7599944781 2359090515 8314497447 7912737103 9877888876 4046534433 0747123418 0588943781 6284997792 9837297897 4063898679 2643451640 5737585977 8744839425 8032592210 1563318039 7169841482 5698356635 9188997629 5351471211 3905774450 1739771466 4650268641 0946248241 08211637,

α=8220765701 6677161639 2295645083 3786098404 5377364917 3263164161 5842095460 8347176795 8314383910 6838300087 8332450440 8079227722 7829626715 4492401350 5177874046 3160709427 8939487852 8737556254 2790192185 4409743264 1912537776 6579916297 4553776942 1764040414 7985455200 6834952531 2224875762 4602378529 0612313367 0589148641 54862251.

Then, T generates a secret number $s \in S_r$. To do so, it needs to generate a random number, z, in the interval [1, r] and calculate $s = \alpha^z \pmod{n}$. Then, it determines the element β:

z=2562266773 7774597450 4409468429 7834074901 8000412016 9914173, s=4753261714 1928251118 2743629876 4391793367 2307333076 1603563912 5002000524 9060497658 0824242118 6704298946 3445895108 4404897626 6689329111 3557924664 5307037629 8989659634 5807828772 4429722874 3556504143 8852477027 0325311761 9225951212 8994160952 8446681790 9094409361 4867349016 1812858607 1648136904 8090599371 8575649900 69295616,

β=4861935264 2803079954 6555178384 8192834398 3164492398 1652625442 7161959668 1467074572 8858845443 7528030493 1407985056 2750859231 2565714340 0369700824 6078908252 2563853007 1595785428 4460245931 4579818936 4632592036 1993827761 2083044887 0729245762 1484480929 0382280230 6144704709 2769342983 0689033301 5305777214 2718955708 68985223.

T calculates its private key, $a_0, b_0, c_0, d_0 \in \mathbb{Z}_r$ and the public key, (P, Q), which will be shared by all the signers of the group G:

a₀=3796851234 6569680283 3338368391 5365556062 4833209082 53580661, b₀=2591850459 9367460902 5934873820 3760658099 0333592083 17194694, c₀=1518925798 4392236395 1016813551 4526953578 9549887870 12160497, d₀=3795856474 1095936126 3365200938 2597076303 2769773305 51257252,

P=8319958649 6056447734 7328052772 9933714896 8407194844 8369500960 5176404651 5164701887 3220925662 9019150287 7627255992 0904205949 0852478635 0690085650 7726157268 1634089222 5831822786 0354912705 0697911594 1772574866 2925316237 6241224905 7755828693 7646145188 0473447052 8492011177 6049627590 7768935677 1530034818 3540964671 99575149,

Q=7646114260 2099407040 5307511791 2284288636 2591565615 1338741603 2204187548 9954259612 1452554504 1316398658 6916773912 5040898369 8517070596 9516952757 9781255613 9956857784 9279960920 3809990561 1580294365 3546145623 3432930343 3600377178 5723369168 1634251649 1476315642 6634673934 9718641568 1411906770 6077428431 1364467438 92098833.

Next, T broadcasts the values (α, β, n, r).

The next step is the calculation of the private keys of the signers of the group G. To do so, T calculates, in the first place, the following values:

h=3872871254 9788136665 1132678495 1408621258 8355187161 47094974, k=9595184946 6557841042 7041038895 8525680100 0947749031 804377.

Finally, T generates the random values $b_i, d_i \in \mathbb{Z}_r^*$, for i=1,...,5, and determines the corresponding values for $a_i$ and $c_i$. In this way, it obtains the 5 private keys, which will be distributed in a secure way to each one of the signers of the group:

$(a_1, b_1, c_1, d_1)$=(3283241757 5870636656 2148739413 6347233920 8366198197 35436378, 1151430213 9289655133 5986558470 5215666832 7514688545 71831717, 3839753842 7757266331 6697562043 9112177778 0738242539 93302939, 2403125912 8894003222 9570075762 6023463547 5329056797 71114669), $(a_2, b_2, c_2, d_2)$=(1550178576 4794736629 8920233691 3661760348 7403838961 45128686, 1563760386 7728655548 8657603181 0647710782 2162854443 65985785, 6103724830 5688795750 4070736808 6412512413 3278352318 4958155, 1759919831 6288861490 4411691354 5080836678 8884940065 70680177), $(a_3, b_3, c_3, d_3)$=(2791564021 0033574126 8721638070 1589015898 1812242310 5344330, 6677309778 5621420138 9539159254 2346765657 8489201524 0252392, 1221691357 9545259603 5141749286 9077438598 0549008717 28371300, 4095493946 8040799465 7837334005 8468133920 9532706455 00497958), $(a_4, b_4, c_4, d_4)$=(2453365078 9361925247 4551356603 8117805834 4499954214 11351773, 6930834099 0325869370 2436425339 9961527746 8907567771 7562893, 2396464971 9220531648 9542977954 4179966718 7496705898 02476593, 3647109711 1114185126 8934154780 7991224353 9039657962 55314516), $(a_5, b_5, c_5, d_5)$=(2814663960 7597908778 4976941814 3370387434 4440465417 57439916, 3435450655 2240480352 2565604258 5579327971 4569713507 39009618, 4168673880 1586125932 7609156104 2565600095 2678283105 60380425, 1821609138 4217289729 1499706890 6952954417 7710311415 86835967).

Key Verification

To verify T's key and the common key of all the signers, it is just necessary for all of them to check these equations $$\alpha \neq 1 \pmod{n},$$

$$\alpha^r = 1 \pmod{n},$$

$$P = \alpha^{a_i} \cdot \beta^{b_i} \pmod{n},$$

$$Q = \alpha^{c_i} \cdot \beta^{d_i} \pmod{n}.$$

which is almost immediate.

Generation of the Multiple Signature with the Collaboration of T

Let suppose that the message to sign is stored in a file, whose content is the following (it is a fragment from "Don Quixote"):

"En esto, descubrieron treinta o cuarenta molinos de viento que hay en aquel campo, y asi como don Quijote los vio, dijo a su escudero:

La aventura va guiando nuestras cosas mejor de lo que acertaramos a desear; porque ves alli, amigo Sancho Panza, donde se descubrieron treinta, o poco más desaforados gigantes, con quien pienso hacer batalla y quitarles a todos las vidas, con cuyos despojos comenzaremos a enriquecer, que ésta es buena guerra, y es gran servicio de Dios guitar tan male simiente de sobre la faz de la tierra.

¿ Qué gigantes?-dijo Sancho Panza.

Aquellos que alli ves-respondió su amo-de los brazos largos, que los suelen tener algunos de casi dos leguas.

Mire vuestra merced-respondió Sancho-que aquellos que alli se parecen no son gigantes, sino molinos de viento, y lo que en ellos parecen brazos son las aspas, que volteadas del viento, hacen andar la piedra del molino."

The calculation of its digest by using the function SHA-1 provides the following value of 160 bits, where their hexadecimal and decimal expressions are, respectively:

m=7b 30 e0 ac a8 c5 7b 09 0a cb a4 b0 54 38 b7 a1 0c d0 41 f3=7032958724 8581323731 3907950135 0552221954 30113779.

The partial signatures of each of the 5 signers are the following:

($f_1$, $g_1$)=(2072061490 3529681837 0518359522 5737119748 8834793544 63211454, 3424899271 6561622167 2309350509 1899483096 2204248546 1401791), ($f_2$, $g_2$)=(7519865574 6123920960 8321708870 7222592072 2194208225 5244963, 3052287160 9193339307 3261388288 7970269665 4298411495 82863325), ($f_3$, $g_3$)=(3035127013 8473367395 5815130273 0222450081 2709055452 62584542, 3343996361 8263990970 5373048282 9321275620 4171100823 79165477), ($f_4$, $g_4$)=(5045916079 6959772237 4311181991 8729548876 2656407924 8876843, 2222053057 4350855533 1345730712 8312259343 4626990198 61867838), ($f_5$, $g_5$)=(2569158690 2819158389 3813867008 1064366690 7818627298 94259816, 3005227651 1941091704 8712925875 3266438452 3528620588 04923843).

T verifies the signature of each one of the signers checking that each signature satisfies the following equation:

$$P \cdot Q^m (\bmod n) = \alpha^{f_i} \cdot \beta^{g_i} (\bmod n), =1, \ldots, 5.$$

From the previous signatures, T determines the multiple signature just by adding all of them together, modulo r.

(f, g)=(3728790875 1858533998 9703774719 7297807179 7475043041 8859292, 3406007886 1460716190 6483759792 8170821493 4745514353 84903948).

Generation of the Multiple Signature without the Collaboration of T

In case that T is not collaborating and supposing that the message to sign is the same as previously, the calculation of each one of the partial accumulated signatures provides the following results.

The signature of $F_1$ is:
($f_1$, $g_1$)=(2072061490 3529681837 0518359522 5737119748 8834793544 63211454, 3424899271 6561622167 2309350509 1899483096 2204248546 1401791).

The verification of the signature of $F_1$ carried out by $F_2$ is correct:
$P \cdot Q^m (\bmod n)$=1170109731 2819367894 2005216580 6494377952 0636567548 9262094548 8344339052 7421432596 8875335205 2402155197 2230378307 2371932777 1738710426 2768241265 6183149313 3478950938 7479706527 9175557453 9751639118 0565551090 7789905395 4819196663 7323682277 9020280066 1028233179 3869192910 1434425082 3384981457 9716434249 5003307128 728028411.

The partial accumulated signature of $F_2$ is:
($f_2$, $g_2$)=(2824048047 8142073933 1350530409 645937895 6105421436 718456417, 3394777088 0849501524 0492323339 7160217975 0518836350 44265116).

The verification of the signature of $F_2$ carried out by $F_3$ is correct:
$P^2 \cdot Q^{2m} (\bmod n)$=7450100059 1091930946 2501858785 0941187993 2537915629 2584859948 2097737510 5853453621 2291364319 8207733759 5107023683 8537744090 0352638596 6504088919 1070451647 0331532795 8444989461 6206800852 4483586001 3000717481 6710298328 4937496631 1635361223 1293962768 8337804042 4332811755 2543722126 3844271970 1015657563 2043360173 11602864.

The partial accumulated signature of $F_3$ is:
($f_3$, $g_3$)=(1579151925 4643079557 7445526473 6737144088 4713253016 28381796, 2458750313 7141130723 6145237413 6536808646 5639920370 70771430).

The verification of the signature of $F_3$ carried out by $F_4$ is correct:
$P^3 \cdot Q^{3m} (\bmod n)$=1082550119 8844366296 9941799029 9216293849 1473245559 8632411906 1624560875 2927058733 8646774165 2669903997 4431524996 7382651963 1695679541 3626062206 6708356175 6861427098 3545735602 5434248163 0193576555 6718878697 5260754944 4570751541 8377058742 3008072805 0382838655 9480158601 5234920504 3658404027 6285123608 4428151260 693636413.

The partial accumulated signature of $F_4$ is:
($f_4$, $g_4$)=(2083743533 4339056781 4876644672 8610098976 0978893808 77258639, 4007802349 5196244857 7708339174 9043830411 2168937657 9980105).

The verification of the signature of $F_4$ carried out by $F_5$ is correct:
$P^4 \cdot Q^{4m} (\bmod n)$=2709868377 7138928608 4769512938 6848964463 7670022794 1393921794 4877807748 7124069046 1975743029 9505734207 6216783854 6104882998 0222474430 8776847832 3556946739 5710850579 9846374769 1955854682 9555230522 0066146680 9121213039 1802059312 0565937216 9390100135 5015555941 6181673016 9769298446 6748808181 1849405818 8552528092 36031649.

The partial accumulated signature of $F_5$, which coincides with the multiple signature of the whole group, is:
(f, g)=($f_5$, $g_5$)=(3728790875 1858533998 9703774719 7297807179 7475043041 8859292, 3406007886 1460716190 6483759792 8170821493 4745514353 84903948).

Multiple Signature Verification

To verify the validity of the previous multiple signature whether T was collaborating or not, any verifier knowing the message, m, the number of signers and the public key, (P, Q), has only to check the following equation $$P^5 \cdot Q^{5m} = \alpha^f \cdot \beta^g (\bmod n),$$

which is immediate, because both values are 1170109731 2819367894 2005216580 6494377952 0636567548 9262094548 8344339052 7421432596 8875335205 2402155197 2230378307 2371932777 1738710426 2768241265 6183149313 3478950938 7479706527 9175557453 9751639118 0565551090 7789905395 4819196663 7323682277 9020280066 1028233179 3869192910 1434425082 3384981457 9716434249 5003307128 728028411.

Security

In case that any two signers, for example, $F_1$ and $F_3$, try to conspire to calculate the secret value, s, of T, they would join their respective signatures, $(f_1, g_1)$ and $(f_3, g_3)$, so that the following value would be calculated $$s' = (f_1 - f_3)(g_3 - g_1)^{-1} \pmod{r} = 2495841599\ 2675813433\ 1673611873\ 1109209990\ 5818069416\ 83953188,$$

but this value is not the real value of s:

s=4753261714 1928251118 2743629876 4391793367 2307333076 1603563912 5002000524 9060497658 0824242118 6704298946 3445895108 4404897626 6689329111 3557924664 5307037629 8989659634 5807828772 4429722874 3556504143 8852477027 0325311761 9225951212 8994160952 8446681790 9094409361 4867349016 1812858607 1648136904 8090599371 8575649900 69295616.

If any other pair of signers try to carry out the same attack, they would obtain the same value of s'. Therefore it would not be obtained any benefit if more signers were in the conspiracy.

Finally, the same kind of conspiracy for signatures of different messages would not provide any improvement either, because the value obtained signing different messages is the same once more.

Operation and Implementation

The scheme proposed to perform multiple digital signatures has been implemented as a Notebook of the software Maple v.13 in a computer with a Intel® Core™2 Quad CPU Q4900 processor at 2.66 GHz, with the operating system Windows 7 of Microsoft with 64 bits and with a 4 GB RAM.

The computational time necessary for each one of the tasks depends on, basically, the length of the keys and on the number of signers that participate in the performance of the multiple signature.

Some examples of computational time (in seconds) for the different tasks, with different inputs, are shown in the following table:

As it can be seen, most of the computational time is consumed in the key generation phase, which is not an inconvenient since once the keys are generated, they can be used during a long period of time to sign different messages.

As a final comment, the previous computation times can be considered rather large, since the computational package Maple v13 has been used. As is well known, Maple is an interpreted language, a fact that impacts negatively on the execution times. To carry out an optimization of this invention, it is advisable to develop a specific hardware and/or software implementation, using the most suitable state-of-the-art tools.

A person skilled in the art could introduce changes and modifications in the embodiments described without departing from the scope of the invention as it is defined in the attached claims.

ACRONYMS AND ABBREVIATIONS

DLP Discrete Logarithm Problem
RSA Rivest-Shamir-Adleman Cryptosystem
SDLP Subgroup Discrete Logarithm Problem

REFERENCES

[Abo07] S. J. Aboud, Two efficient digital multisignature schemes, Int. J. Soft. Comput. 2 (2007), 113-117.
[AA07] S. J. Aboud and M. A. Al-Fayoumi, A new multisignature scheme using re-encryption technique, J. Applied Sci. 7 (2007), 1813-1817.
[BN06] M. Bellare and G. Neven, Multi-signatures in the plain public-key model and a general forking lemma, Proceedings of the 13th ACM conference on Computer and Communications Security (CCS'06), 390-399, 2006, Alexandria, Va., USA.
[DHM05] R. Durán Díaz, L. Hernández Encinas and J. Munoz Masqué, El criptosistema RSA, RA-MA, Madrid, 2005.
[Boy88] C. Boyd, Some applications of multiple key ciphers', Lecture Notes in Comput. Sci. 330 (1988), 445-467.
[ElG85] T. ElGamal, A public-key cryptosystem and a signature scheme based on discrete logarithm, IEEE Trans. Inform. Theory 31 (1985), 469-472.
[FSNT09] H. Fujimoto, T. Suzuki, T. Nakayama, A. Takeshita, (NTT DoCoMo, Inc., Tokyo, JP), Multi signa-

|  | Size (in bits) of r and n, respectively | | | | |
| --- | --- | --- | --- | --- | --- |
|  | 128, 1024 | 192, 1024 | 192, 1024 | 192, 1024 | 256, 2048 |
| Number of signers | 5 | 5 | 15 | 50 | 10 |
| Key generation time | 6.879 | 5.397 | 5.413 | 5.413 | 132.211 |
| Key verification time | 0.015 | 0.031 | 0.062 | 0.187 | 0.187 |
| Computational time of the multiple signature with the collaboration of a Trusted Third-Party | 0.000 | 0.015 | 0.031 | 0.110 | 0.094 |
| Computational time of the multiple signature without the collaboration of a Trusted Third-Party | 0.000 | 0.015 | 0.047 | 0.140 | 0.093 |
| Multiple signature verification time | 0.000 | 0.000 | 0.000 | 0.000 | 0.016 | ture verification system, electronic signature attaching apparatus, data addition apparatus, and electronic signature verification apparatus, United States Patent: U.S. Pat. No. 7,627,763 B2, Dec. 1, 2009.

[FGHMM04] A. Fúster Sabater, A. de la Gula Martinez, L. Hernández Encinas, F. Montoya Vitini y J. Muñoz Masqué, Técnicas criptográficas de protección de datos, RA-MA, 3 $_a$ ed., Madrid, 2004.

[Gen10] C. B. Gentry (NTT DoCoMo, Inc., Tokyo, JP), Signature schemes using bilinear mappings, United States Patent: U.S. Pat. No. 7,653,817 B2, Jan. 26, 2010.

[GR10] C. B. Gentry and Z. A. Ramzan (NTT DoCoMo, Inc., Tokyo, JP), Digital signatures including identity-based aggregate signatures, United States Patent: U.S. Pat. No. 7,664,957 B2, Feb. 16, 2010.

[HK89] L. Harn and T. Kiesler, New scheme for digital multisignature, Elect. Lett. 25 (1989), 1002-1003.

[He02] W. H. He, Weakness in some multisignature schemes for specified group of verifiers, Inform. Proc. Lett. 83 (2002), 95-99.

[HCC98] S. J. Hwang, C. Y. Chen and C. C. Chang, An encryption/multisignature scheme with specified receiving groups, Comput. System Sci. Engrg. 13, 2 (1998), 109-112.

[IN83] K. Itakura and K. Nakamura, A public-key cryptosystem suitable for digital multisignatures, NEC Res. Development 71 (1983), 1-8.

[KH90] T. Kiesler and L. Harn, RSA blocking and multisignature schemes with no bit expansion, Elect. Lett. 26 (1990), 1490-1491.

[KOKS09] Y. Komano, K. Ohta, S. Kawamura, and A. Shimbo (Toshiba Corp., Tokyo, JP), Multisignature method, apparatus, program, and system, United States Patent: U.S. Pat. No. 7,496,759 B2, Feb. 24, 2009.

[LY96] C. S. Laih and S .M. Yen, Multisignature for specified group of verifiers, J. Inform. Sci. Engrg. 12, 1 (1996), 143-152.

[MFM04] D. A. Modiano, L. Friseh, and D. Mouton (France Telecom, Paris, FR), Electronic group signature method with revocable anonymity, equipment and programs for implementing the method, United States Patent Application: US 2004/0260926 A1, Dec. 23, 2004.

[LWK05] J. Lv, X. Wang and K. Kim, Security of a multisignature scheme for specified group of verifiers, Appl. Math. Comput. 166 (2005), 58-63.

[HMV04] D. Hankerson, A. J. Menezes y S. Vanstone, Guide to elliptic curve cryptography, Springer-Verlag, Nueva York, 2004.

[Men93] A. J. Menezes. Elliptic curve public key cryptosystems. Kluwer Academic Publishers, Boston, 1993.

[MOV97] A. Menezes, P. van Oorschot and S. Vanstone, Handbook of applied cryptography, CRC Press, Boca Raton, Fla., USA, 1997.

[NIST02] National Institute of Standards and Technology, Secure Hash Standard (SHS), Federal Information Processing Standard Publication 180-2, 2002.

[OO91] K. Ohta and T. Okamoto, Multi-signature schemes based on the Fiat-Shamir scheme, Lecture Notes in Comput. Sci. 739 (1991), 139-148.

[OO01] K. Ohta and T. Okamoto (Nippon Telegraph and Telephone Corporation, Tokyo, JP), Method and apparatus for en-bloc verification of plural digital signatures and recording medium with the method recorded thereon, United States Patent: U.S. Pat. No. 6,212,637 B1, Apr. 3, 2001.

[Oka88] T. Okamoto, A digital multisignature scheme using bijective public-key cryptosystems, Commun. ACM Trans. Computer Systems 6 (1988), 432-441.

[PPKW97] S. Park, S. Park, K. Kim and D. Won, Two efficient RSA multisignature schemes, Lecture Notes in Comput. Sci. 1334 (1997), 217-222.

[PLL85] S. F. Pon, E. H. Lu and J. Y. Lee, Dynamic reblocking RSA-based multisignatures scheme for computer and communication networks, IEEE Communications Letters 6 (2002), 43-44.

[QX10] H. Qian and S. Xu, Non-interactive multisignatures in the plain public-key model with efficient verification, Inform. Proces. Letters 111 (2010), 82-89.

[RSA78] R. L. Rivest, A. Shamir and L. Adleman, A method for obtaining digital signatures and public-key cryptosystems, Comm. ACM 21 (1978), 120-126.

[Shi01] A. Shimbo (Kabushiki Kaisha Toshiba, Kawasaki, JP), Digital signature method using an elliptic curve, a digital signature system, and a program storage medium having the digital signature method stored therein, United States Patent: U.S. Pat. No. 6,088,798 A, Mar. 27, 2001.

[SFH01] F. W. Sudia and P. C. Freund, S. T. F. Huang (CertCo Inc., New York, US), Multi-step digital signature method and system, United States Patent: U.S. Pat. No. 6,209,091 B1, Mar. 27, 2001.

[Sus09] W. Susilo, Short fail-stop signature scheme based on factorization and discrete logarithm assumptions, Theor. Comput. Sci. 410 (2009), 736-744.

[TK02] K. Takaragi, H. Kurumatani (Hitachi, Ltd., Tokyo, JP), Digital signature generating/verifying method and system using public key encryption, United States Patent: U.S. Pat. No. 6,341,349 B1, Jan. 22, 2002.

[WP95] M. Waidner and B. Pfitzmann, The dining cryptographers in the disco: Unconditional sender and recipient untraceability with computationally secure serviceability, Lecture Notes in Comput. Sci. 434 (1989), 690.

[WCW96] T. C. Wu, S. L. Chou, and T. S. Wu, Two ID-based multisignature protocols for sequential and broadcasting architectures, Comput. Comm. 19 (1996), 851-856.

[Yen96] S. M. Yen, Cryptanalysis and repair of the multi-verifier signature with verifier specification, Computers & Security 15, 6 (1996), 537-544.

[YY05] E. J. Yoon and K. Y. Yoo, Cryptanalysis of Zhang-Xiao's multisignature scheme for specified group of verifiers, Appl. Math. Comput. 170 (2005), 226-229.

[ZW10] Y. Zhang, S. Wang, and X. Wang, Method for protecting security of digital signature documents of multiple verifiers strongly designated by multiple signers, China Patent: CN 101651541, Feb. 17, 2010.

[ZX04] Z. Zhang and G. Xiao, New multisignature scheme for specified group of verifiers, Appl. Math. Comput. 157 (2004), 425-431.

The invention claimed is:

1. A procedure for a multiple digital signature comprising:
   i) generating, by a Trusted Third Party (T), a set of parameters, its own private key and a private key for each signer or member $(F_1, F_2, \ldots, F_t)$ of a group of signers (G);
   ii) generating, by each of said signers, $(F_1, F_2, \ldots, F_t)$, a partial signature on a digest (m) of a document (M) using their private keys;
   iii) generating a multiple signature from said partial signatures; and
   iv) verifying, by a verifier, said multiple signature;

wherein the procedure is characterised in that it comprises:
   determining, by said Trusted Third Party (T), a single and common public key for all of said signers ($F_1, F_2, \ldots, F_t$), in (G), by computing two integer numbers (P) and (Q), in $Z_n$, $P = \alpha^{a_0} \cdot \beta^{b_0} (\mod n)$, $Q = \alpha^{c_0} \cdot \beta^{d_0} (\mod n)$; and determining, by said Trusted Third Party (T), individual private keys of the signers ($F_1, F_2, \ldots, F_t$) of the group of signers (G), associated to said determined single and common public key, by computing ($a_i, b_i, c_i, d_i$), for $i=1, \ldots, t$,
wherein:
   ($a_0, b_0, c_0, d_0$) are four random integer numbers belonging to $Z_r$ that define the private key of the Trusted Third Party (T);
   ($b_i, d_i$), for $i=1, \ldots, t$, are t pairs of random integer numbers in $Z_r$, and ($a_i, c_i$), for $i=1, \ldots, t$, are t pairs of integer numbers in $Z_r$ verifying the following conditions:

$a_i = (h - s \cdot b_i)(\mod r)$, $c_i = (k - s \cdot d_i)(\mod r)$;

and h and k are two secret integer numbers, in $Z_r$, defined by $h = (a_0 + s \cdot b_0)(\mod r)$, $k = (c_0 + s \cdot d_0)(\mod r)$; and generating, by said Trusted Third Party (T), a set of parameters ($n, r, \alpha, \beta, p, q, s$) so that it publishes $n, r, \alpha$, and $\beta$, and keeps $p, q$, and $s$ secret, where $n = p \cdot q$, $p = u_1 \cdot r \cdot p_1 + 1$ and $q = u_2 \cdot r \cdot q_1 + 1$ are two large prime numbers, $u_1$ and $u_2$ are two even integer numbers, whose greatest common divisor (gcd) verifies $\gcd(u_1, u_2) = 2$, $p_1, q_1, r$, are prime numbers,
$\alpha$ is an invertible element in the group of integers modulo n, $Z_n$, with multiplicative order r, verifying the condition $\gcd(\alpha, (p-1)(q-1)) = 1$;

$\beta = \alpha^s (\mod n)$, and
s is a random secret number in the subgroup generated by $\alpha$.

2. A procedure according to claim 1, wherein each signer ($F_1, \ldots, F_t$) further computes, with the necessary collaboration of a Trusted Third Party (T), her own signature, ($f_i, g_i$), for a hash of the digest (m) which is given by $f_i = a_i + c_i \cdot m (\mod r)$, $g_i = b_i + d_i \cdot m (\mod r)$, and further sending, each signer, said own computed signature, in a secure way, to the Trusted Third Party (T).

3. A procedure according to claim 2, comprising verifying, by the Trusted Third Party (T), the computed signature of each signer ($F_1, F_2, \ldots, F_t$) by checking:

$P \cdot Q^m (\mod n) = \alpha^{f_i} \cdot \beta^{g_i} (\mod n), i=1, \ldots, t.$ 4. A procedure according to claim 3, wherein the Trusted Third Party (T) further computes and publishes the short multiple digital signature, (f, g), of the group (G) for the hash of the digest (m) further comprising the following:

$f = (f_1 + \ldots + f_t)(\mod r) = \Sigma_{i=1,\ldots,t} f_i (\mod r)$, $g = (g_1 + \ldots + g_t)(\mod r) = \Sigma_{i=1,\ldots,t} g_i (\mod r)$.

5. A procedure according to claim 1, wherein the first signer ($F_1$) further determines, without the collaboration of the Trusted Third Party (T), her own partial aggregated signature ($f_1, g_1$) for the hash of the digest (m) where:

$f_1 = a_1 + c_1 \cdot m (\mod r)$, $g_1 = b_1 + d_1 \cdot m (\mod r)$, and sends it, in a secure way, to the second signer ($F_2$).

6. A procedure according to claim 5, wherein each signer but the first one ($F_2, \ldots, F_t$) further verifies, without the collaboration of the Trusted Third Party (T), the partial aggregated signature (($f_{i-1}, g_{i-1}$), $i=2, \ldots, t$) already calculated by the previous signer, by checking $P^{i-1} \cdot Q^{(i-1)m} = \alpha^{f_{i-1}} \cdot \beta^{g_{i-1}} (\mod n), i=2, \ldots, t.$ 7. A procedure according to claim 6, wherein each signer but the first one ($F_2, \ldots, F_t$) further determines, without the collaboration of the Trusted Third Party (T), her own partial aggregated signature (($f_{i-1}, g_{i-1}$), $i=2, \ldots, t$) by computing $f_i = f_{i-1} + a_i + c_i \cdot m (\mod r) = a_1 + \ldots + a_i + (c_1 + \ldots + c_i)m (\mod r), i=2, \ldots, t,$ $g_i = g_{i-1} + b_i + d_i \cdot m (\mod r) = b_1 + \ldots + b_i + (d_1 + \ldots + d_i)m (\mod r), i=2, \ldots, t,$ and further sending said determined own partial aggregated signatures, except the last signer ($F_t$), in a secure way, to the next signer of the group of signers.

8. A procedure according to claim 7, wherein the last signer ($F_t$) further publishes, without the collaboration of the Trusted Third Party (T), her partial aggregated signature as the short multiple digital signature, (f, g), of the whole group of signers:

$(f, g) = (f_t, g_t)$.

9. A procedure according to claim 4, wherein a verifier determines whether the short multiple digital signature (f, g) of the group (G) for the hash of the digest (m) or document (M), makes the following expression hold true:

$P^t \cdot Q^{t \cdot m} = \alpha^f \cdot \beta^g (\mod n)$.

* * * * *